United States Patent [19]
Cirillo et al.

[11] Patent Number: 5,676,913
[45] Date of Patent: Oct. 14, 1997

[54] MOBILE APPARATUS FOR THE PURIFICATION OF POLLUTED AIR, AND PROCESS THEREFOR

[75] Inventors: Francesco Cirillo; Remo Pimpinelli, both of Rome, Italy

[73] Assignee: BCP S.r.l., Rome, Italy

[21] Appl. No.: 499,495

[22] Filed: Jul. 7, 1995

Related U.S. Application Data

[63] Continuation-in-part of PCT/IT95/00019, Feb. 14, 1995, abandoned.

[30] Foreign Application Priority Data

Feb. 18, 1994 [IT] Italy .................................. RM94A0085
Apr. 11, 1995 [IT] Italy .................................. RM95A0230

[51] Int. Cl.⁶ .................. B01D 50/00; C01B 13/00; C01B 31/18; C07C 11/24
[52] U.S. Cl. .............. 423/219; 423/245.3; 423/247; 422/170
[58] Field of Search ............... 423/245.3, 247, 423/219; 422/170

[56] References Cited

U.S. PATENT DOCUMENTS

| | | | |
|---|---|---|---|
| 3,738,088 | 6/1973 | Colosimo | 55/106 |
| 4,551,304 | 11/1985 | Holter et al. | 423/247 |
| 5,145,822 | 9/1992 | Falke et al. | 522/150 |
| 5,227,144 | 7/1993 | Perez de la Garza | 423/219 |
| 5,422,331 | 6/1995 | Calligau et al. | 562/333 |

FOREIGN PATENT DOCUMENTS

| | | | |
|---|---|---|---|
| 0532207 | 3/1993 | European Pat. Off. | |
| 4318738 | 7/1994 | Germany. | |
| 4317199 | 11/1994 | Germany | 423/219 |
| 4297341 | 10/1992 | Japan. | |
| 6-205930 | 7/1994 | Japan | 423/219 |
| 2218354 | 11/1989 | United Kingdom. | |
| 9011433 | 10/1990 | WIPO. | |
| 91/9775 | 7/1991 | WIPO. | |
| 9117803 | 11/1991 | WIPO. | |

OTHER PUBLICATIONS

Newspaper Article "Mobile Air Purification" German Undated But 2 1993.
Newspaper Article "Superkat in Cars Ensures Clean Air Forever" Germany 28 Sep. 1993.

*Primary Examiner*—Gary P. Straub
*Attorney, Agent, or Firm*—Browdy and Neimark

[57] ABSTRACT

A vehicle, preferably a public transport vehicle, transports an apparatus providing for intake of polluted air, which is purified of carbon, nitrogen and sulphur oxides, unburned matter and particulate, the impurities being collected and disposed of after a working cycle of around 10 hours. The energy consumption is negligible when compared with the volume of air treated. (FIG. 2).

19 Claims, 2 Drawing Sheets

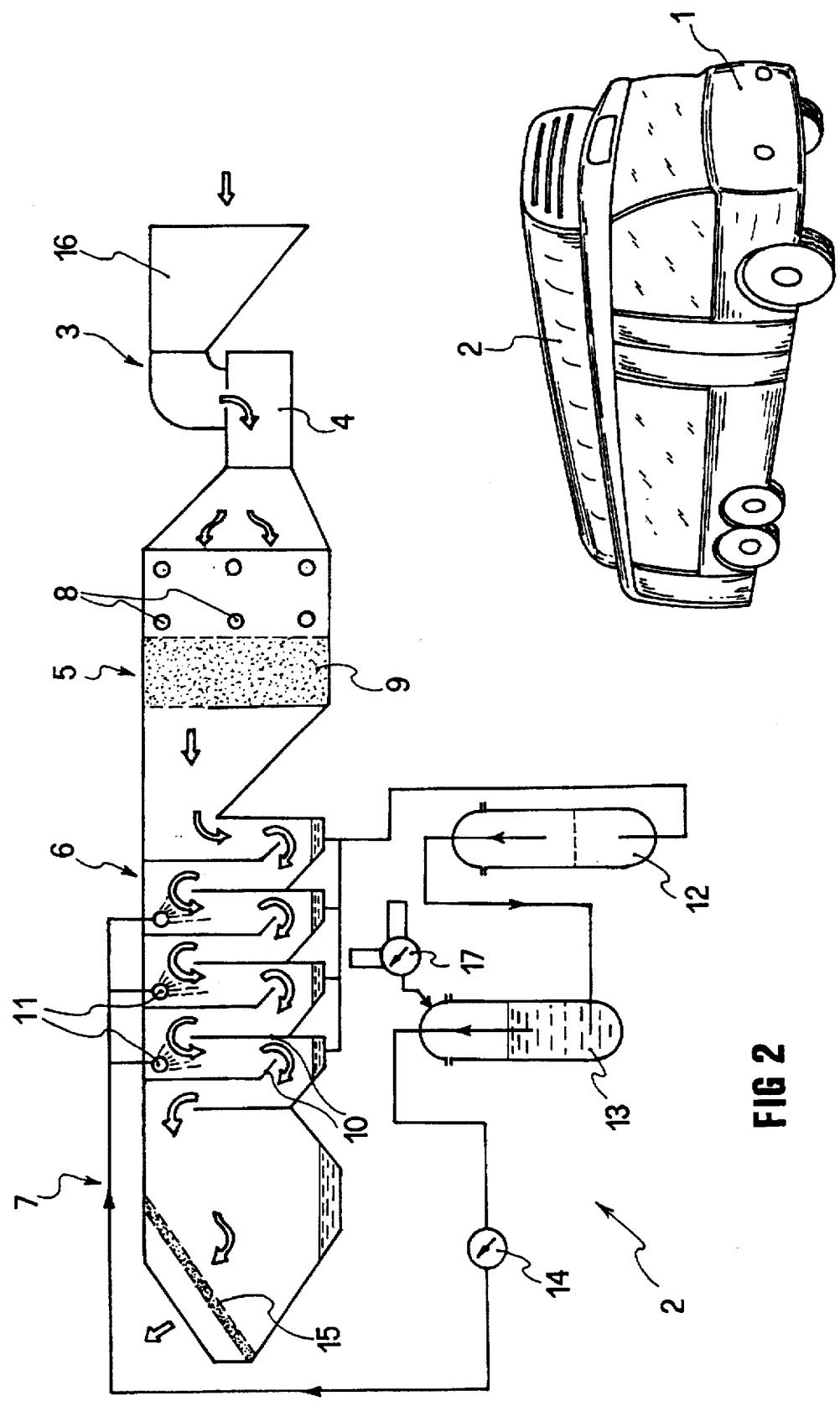

MOBILE APPARATUS FOR THE PURIFICATION OF POLLUTED AIR, AND PROCESS THEREFOR

CROSS REFERENCE TO RELATED APPLICATIONS

This is a Continuation in Part of International Application PCT/IT95/00019 with an international filing date of Feb. 14, 1995, now abandoned.

TECHNICAL FIELD

The present invention relates to an apparatus and a process that allow purification, with a minimum expenditure of energy, of an appreciable amount of air in a metropolitan environment polluted with carbon, nitrogen and sulphur oxides, as well as with particles of dust and smog.

The apparatus is designed and built in a size suitable for transportation on a vehicle travelling the streets of a town or city. A particularly suitable type of vehicle for this purpose is a public transport vehicle for transport by road or rail, capable of purifying an appreciable amount of air during its day-to-day working cycle while consuming a low amount of energy and using low cost chemical reagents.

BACKGROUND ART

The problem of atmospheric pollution in towns and cities due to the circulation of vehicles powered by internal combustion engines is universally known, as are the difficulties in solving this problem, even partially.

The International Patent Application No. WO 9755 describes an apparatus for treatment of air transported by a vehicle, and containing a filter system made up of a series of electrostatic filters to retain the ionised particles contained in the air. This system, however, is incapable of acting on the gaseous chemical pollutants, and involves excessively frequent removal and/or maintenance of the filters.

Catalytic systems are also known, and are used for catalytic post-combustion of the products of combustion, to purify them of unburned solids. However, these systems are applied to gaseous fluids with a high concentration of combustion products, and are only active at a temperature much higher than that of the surrounding environment, which means that a notable consumption of energy is required specifically for the purpose.

The problem of a treatment to purify air characterised by the pollution typical of towns and cities requires performance of the following functions: reduction of dust, reduction of particulate and unburned hydrocarbons, reduction of the concentrations of sulphur, nitrogen and carbon dioxides and reduction of the concentration of carbon monoxide.

In order to reduce the level of dust, particulate and unburned substances the state of the art provides systems such as dry filters or viscous filters of various degrees of fineness and thus with various levels of filtering power, electrostatic filters, dynamic filters (scrubbers), damp filters and purification tunnels.

None of the above mentioned systems can be used to obtain the object of the present invention.

In fact, dry filters, viscous filters and electrostatic filters lose their effect as the material retained accumulates and thus, in the application in question, given the available surface area, which is limited by problems of bulk, these systems would require the frequent removal or cleaning of the filters, in terms of 1 per hour.

The dynamic filters normally used for separation of medium to large sized particles are of low efficiency when dealing with the size of particle present in the polluted air of an urban town or city environment, and in any case, to give a sufficient flow of air to be treated, require the presence of centrifugal dust separators of a size unsuitable to be carried on a vehicle.

Washing filters and tunnels, in comparison with the working flow rate of air to be treated and the concentration of fine dust, require the use of excessive amounts of space when compared with that available in case of application on a vehicle, and the same thing can be said for the amount of washing liquid used for purification, which, according to the current dimensions of these devices, would involve the need to load the vehicle with large amounts of liquid.

DISCLOSURE OF THE INVENTION

The present invention provides a mobile apparatus on a transport vehicle and a related purification process that performs a cleaning operation which does not require large amounts of liquid or employ large amounts of space, and which is such that it offers the advantages typical of dynamic filters in combination with those typical of washing tunnels, without involving the problems indicated above.

The abatement of pollutant concentration is obtained by oxidation of the pollutants from their lower oxide form to the corresponding higher oxides which can be recovered in a water solution by action of chemical reactants. Oxidation is carried out by nascent oxygen and an oxidation catalyst.

The reaction can be carried out at ambient temperature by low cost catalysts. It has been found that also catalysts mixed with Pt or noble metals are effective at ambient temperature.

The temperature can also be raised slightly above the ambient temperature by heating the catalyst with the heat recovered from the operation of the motor driving the vehicle.

An object of the present invention is therefore a mobile apparatus for the purification of polluted air in an urban environment installed on a transport vehicle, comprising: an inlet section for the air to be purified; an oxidation section following said inlet section, to oxidise CO into $CO_2$ and nitrogen oxides $NO_x$ into $NO_2$ by the action of nascent oxygen and of a catalyst active at least at ambient temperature selected from the group consisting of an oxide of a metal of the first series of transition elements of the periodic system or an active salt thereof, a mixed catalyst based on said oxide or salt with a metal of the group VIII and IB of the second and third series of transition elements, Pt, and mixed catalysts of Pd, Pt and Au one with the other, a washing section following said oxidation section to purify the air from said higher carbon and nitrogen oxides and from $SO_2$ by reaction with hydroxyl ions deriving from lime or sodium bicarbonate or a mixture thereof in solution in an aqueous washing solution to obtain insoluble salts and to reduce nascent oxygen or residual ozone by means of a catalytic filter, as well as particles, dust and unburned substances; an apparatus for separation of said insoluble salts from the washing liquid and for renewing and returning said liquid to the washing section; a section for discharging the purified air into the external environment, following said washing section; and a system for suction of the outside air to introduce said air into the inlet section.

A further object of the present invention is the process used in the apparatus as described above.

BRIEF DESCRIPTION OF THE DRAWINGS

The invention will be described in greater detail with reference to the drawings, in which:

FIG. 1 is a general view of the apparatus installed on an urban transport vehicle;

FIG. 2 is a plan view of the apparatus according to the present invention; and

MODES FOR CARRYING OUT THE INVENTION

Figure 3:
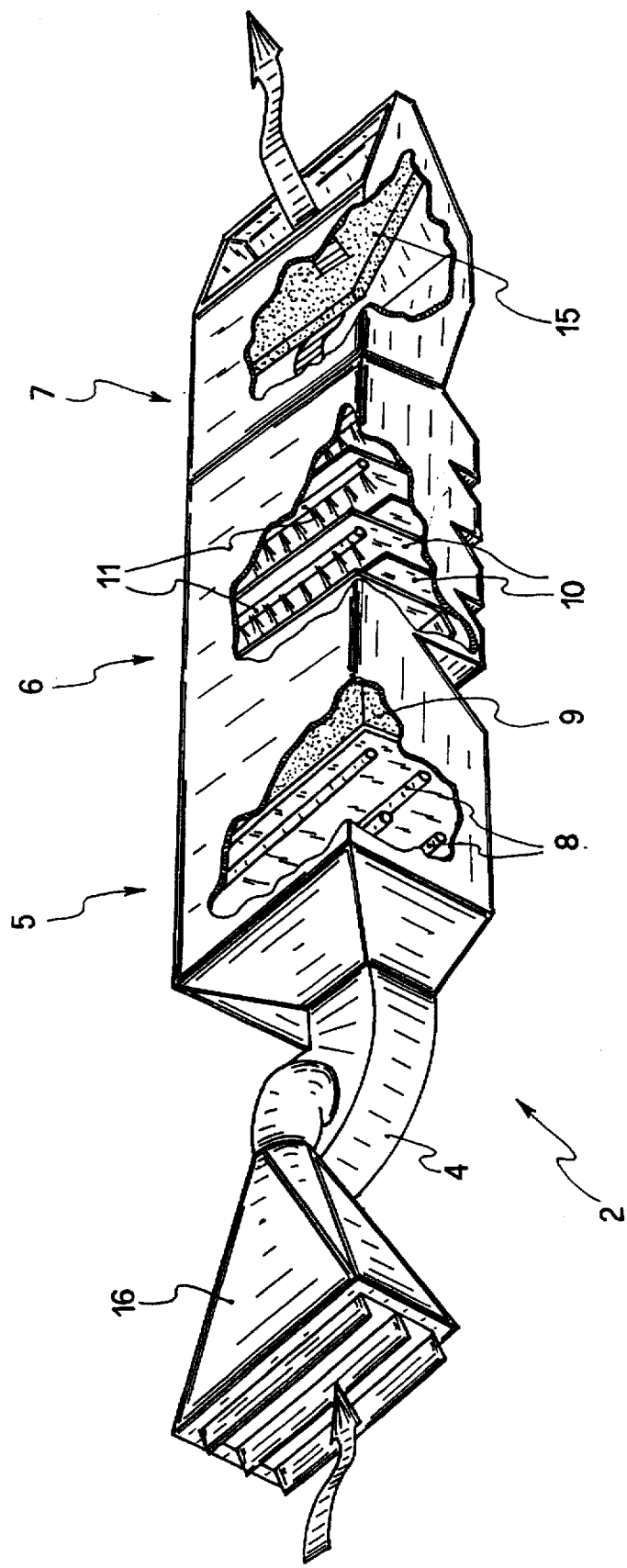
FIG. 3 is a partly cut-away view of an embodiment of the apparatus of FIG. 2.

A typical application for the present invention is illustrated in FIG. 1. A vehicle 1 carries on its roof a purification apparatus 2 according to the invention. The vehicle 1 is typically an urban transport vehicle that travels the town roads during its working day, which can be calculated to last around 10 hours. As the apparatus 2 is a module capable of treating an air flow rate of around 2000 m$^3$/hour it can be calculated that each urban transport vehicle can purify 20000 m$^3$ of air per working day in each module installed.

Furthermore, as working tests have shown that the apparatus according to the invention has an energy consumption of approximately 3 kWh, it can easily be seen that a vehicle 1 equipped as indicated above produces an amount of purified air during the day that is greatly in excess of the pollution produced by the vehicle itself, and with minimum energy costs compared with the energy produced by the vehicle to move itself.

The plan of the apparatus is illustrated in FIG. 2.

It comprises an inlet section 3 for the air, served by a suction feeder 16 provided with traps for leaves and other foreign bodies, in which a fan 4 feeds the flow of air to be treated, at a relatively low speed, into an oxidation section 5. The air then accelerates inside a washing section 6, passing through a series of labyrinths within which the air is made to pass through several barriers of chemically activated water. From here, the flow of air slows down in an accumulation section 7 or stilling pool, where any water that may have been carried in is separated from the air before the latter is finally returned to the surrounding environment.

It can be noted that the fan 4 can also be situated, for example, downstream of the oxidation section 5, without altering the process. The oxidation section has the aim of transforming the carbon monoxide CO into $CO_2$, and the nitrogen oxides $NO_x$ into $NO_2$, so that these oxides, and in particular $NO_2$, are able to react in the washing section 6 with chemical reagents capable of transforming them into insoluble products that can be precipitated and separated off.

The oxidation of the polluting oxides mentioned above is obtained by the action of nascent oxygen. The nascent oxygen is generated by the decomposition of ozone produced in the oxidation section. The ozone is produced during the passage of air over a group of lamps capable of producing ultraviolet light with a wavelength of below 250 millimicron.

As an alternative, ozone can be produced by a high voltage system which produces electric discharges in the air to be treated.

Normally speaking, the concentration of NO is three times lower than that of CO, so that it is advisable to size the process according to the amounts of CO to be treated. Bearing in mind that the emission of ozone into the atmosphere is to be avoided and considering the positive effect of the subsequent washing, it is preferred to use a limited number of UV lamps.

The ozone or the nascent oxygen could also be produced by means of other physical or chemical processes, for example the formation of high voltage electric discharges.

In order to avoid emission of ozone into the atmosphere it should be noted that the washing chamber and the accumulation chamber immediately beyond the oxidation section are sized in such a way as to provide for reduction of any ozone remaining after the oxidation process into oxygen. This is also the case in the event of accidental stoppage of the washing system, as the residual ozone is consumed by oxidising the catalytic surfaces, and also because a flow meter is installed in the washing system and, in the absence of flow, this prevents the ultraviolet lamps 8 from turning on.

As regards the problem of reducing the concentration of harmful oxides, the state of the art essentially proposes catalytic oxidation based on catalysts preferably made up of precious metals such as platinum, cobalt and the like, which are activated at high temperatures. In the present invention, the oxidation is preferably promoted by a catalytic bed 9 which is active at least at ambient temperature, said bed comprising one or more catalysts.

Representatives of catalysts of the group comprising metal oxides of the first series of the transition series or an active salt thereof are Cu(IV) oxide, NiO, Fe oxide, CuO, ZnO, $MnO_2$, $CuCr_2O_4$. Representatives of mixed catalysts are catalysts of the above mentioned group mixed with Pt, Pd, Au, or mixed catalysts of Pt, Pd, Au mixed one with the other. All the above catalysts have shown to be active at room temperature or a temperature slightly above the room temperature in a range from room temperature up to 50° C. In a range from about 25° to 35° C. particularly good results have shown Fe oxide/Pt catalysts supported on alumina.

The above mentioned catalysts are active at room temperature and they do not need essentially any additional heat supply.

However when the room temperature sinks below the normal range or to increase the catalyst efficiency in the case that an individual catalyst has an optimum efficiency for abatment of pollutants at the upper limit of the room temperature or slightly above, a supplementary heat supply can be provided to the catalyst by resorting to the heat dissipated by the motor powering the vehicle.

In fact it is possible to pass the exhaust pipe or the cooling fluids of the motor into the inside of the catalyst section of the system in order to heat the same. In this way the temperature of the catalyst is increased without further thermal pollution of the environment and without additional energy expenditure.

The same catalysts promote decomposition of the residual ozone and, in order to prevent the latter from reaching the external atmosphere, the same catalysts can also be present in the successive washing and accumulation sections.

Reduction of $SO_2$, $NO_2$ and $CO_2$ downstream of the oxidation section 5 takes place mainly in the washing section 6, by intimate contact and reaction with a chemically activated washing liquid made up of an aqueous solution containing hydroxyl ions from substances such as lime, sodium bicarbonate or the like, which by reacting with the polluting oxides produce insoluble salts that are separated by means of filtration or precipitation.

As reaction products, calcium nitrate is obtained from nitrogen oxides, calcium carbonate from carbon monoxide, and calcium sulphite from sulphur monoxide, or the corresponding carbonates obtained from the decomposition of bicarbonate to carbonic acid.

In a preferred embodiment, the washing section is made up of a labyrinth within which the air follows a route with a series of brusque 180° inversions of direction accompanied by an equal number or double the number of washing barriers. Section 6 is in fact subdivided by a series of walls 10 that form a serpentine-shaped route, while a battery of nozzles 11 spray the washing liquid onto the metal walls, generating an atomisation that promotes contact between the liquid phase and the gaseous phase and also produce a series of liquid barriers to the passage of the air. The washing liquid collects on the bottom of section 6 and is sent to a recycling circuit comprising a filter apparatus 12 and followed by this a settling chamber 13 from which the liquid is picked up by a pump 14 and recycled to the nozzles 11. The settling chamber 13 is served by a supply device 17 which restores the hydroxyl ions to the desired concentration, measured by means of a pH-meter.

It should be noted that in the present invention the washing operation does not merely perform the process of chemical reduction of the concentration of sulphur, nitrogen and carbon oxides, but also acts as a highly effective filter to reduce particulate and unburned hydrocarbons, due to the mechanical drag produced by the washing barriers and the rapid changes in direction of the route.

On leaving the washing section, the purified flow of air, which is still rich in atomised water particles, passes into the accumulation section 7 or stilling pool, where the increase in the cross-section of flow slows down the mass flow rate of air, allowing precipitation of the drops, which collect on the bottom of the bath. After passing through a final filter 15, preferably catalytic, which helps to retain the liquid phase in the apparatus to complete the oxidation reaction of the pollutants, and reduce any residual ozone until the concentration is brought down to zero, as well as protecting against the entry of foreign substances from the outside, the purified air is returned to the atmosphere.

In FIG. 3 it is possible to see in a more realistic form a modular unit of the apparatus according to the present invention, which merely as an example, in order to treat an air flow of around 2000 m³/hour is made up of a washing section formed by a parallelepiped of 500 by 1000 mm within which an air passage approximately 4 m long is formed, with between five and eight 180° inversions of direction and between 10 and 16 washing barriers. An apparatus sized in this manner requires less than 70 liters of water to provide an operating range of 10 hours of continuous operation. The energy consumption for the whole process is around 2.8 kWh. When considering the pollution produced by an internal combustion engine continuously supplying the same amount of power, it is found that the amount of pollutants produced by said motor would be many times lower than the amount of pollutants that the apparatus would eliminate from the atmosphere, which means a considerable gain when comparing the purification achieved and the pollution produced to achieve it.

It should also be noted that the characteristics of the process and the form of construction are such that they do not involve high costs, as the chemical reagents are commonly available low cost products, and even the catalysts can be obtained by using particularly low cost materials.

In FIG. 3 the elements similar to those illustrated in FIG. 2 are indicated with the same reference numbers.

A description will now be given of certain embodiments, with the process data found during operation of the apparatus.

EXAMPLE 1

An apparatus is built with a suction funnel 16 with a size of 520×890×500 mm and a centrifugal fan having the following characteristics:

capacity: 1960 m³/hour
hydraulic head: 195 mm of water
power consumption: 1.5 kW
motor: three-phase asynchronous
belt transmission
vertical axis to limit bulk.

The fan discharges into a diffuser sized in such a way as to reduce the speed of the air at the entry into the subsequent oxidation section and to reduce the load loss.

The oxidation section is sized in such a way as to optimise load loss, bearing in mind the presence of the obstacle formed by the ozonization lamps.

The washing section was built with passage through five separate water barriers, each one obtained by means of five spray nozzles of the type H1/4 VV11001 which allow a 110° aperture of the jet at 3 bar giving a total flow rate of all 25 nozzles equal to approximately 10 liters/minute.

The total load loss through the circuit was approximately 5.25 kg/cm². The re-cycling pump 14 had a prevalence of approximately 10 kg/cm² to provide a flow rate of approximately 10 liters/minute, with a power consumption of approximately 0.4 kW.

The UV lamps numbered 8, each of which was capable of producing approximately 1 g/hour of ozone.

The apparatus, when tested in the most severe conditions foreseen for operation, corresponding to an environmental temperature of 35° C. and a relative humidity of 30%, showed a consumption of washing water of 7 liters/hour, a corresponding consumption per hour of aqueous lime equal to 50 g/hour and a consumption of bicarbonate of 50 g/hour.

The washing circuit thus results sized in such a way as to guarantee self-sufficiency for 10 hours of continuous operation with a total capacity of 100 liters, thus requiring regeneration only once every 10 hours of continuous operation.

EXAMPLE 2

The apparatus described in the preceding example 1 was made to undergo testing as follows.

Upstream of the apparatus a chamber was installed with a volume of approximately 1.5 m³, made of anodised metal plate, within which varying ratios of clean air from the environment were mixed with the exhaust fumes from a 4000 cm³ diesel engine running at a constant speed.

From this chamber the polluted and mixed air was sucked by the fan, on the outlet of which a probe was installed to pick up samples of polluted air (upstream of the treatment). A second probe was installed downstream of the oxidation section in order to pick up samples of oxidised air before it undergoes washing.

A third probe was installed downstream of the device in the stream of treated air leaving it.

Over 500 measurements were taken, using the colourimetric system in a variety of conditions to measure the pollution level, environmental conditions (temperature, relative humidity, pressure), the oxidation level, and the type of reagent.

The results obtained can be summarised as follows:
with reference to the pollution level corresponding with the so-called "warning level" for urban pollution, it was seen that even wide variations in environmental conditions have no noticeable effect on the efficiency of the invention, with the exception of the consumption of washing water, which in any case remains lower than 7 liters/hour;

in the conditions indicated above and with an ozone production equivalent to 2 mg/m$^3$, the results obtained with Ca (OH$_2$) are equivalent to those obtained with NaHCO$_3$.

The results of the second test session fully confirmed those of the first session.

|  | First day | | | Second day | | |
| --- | --- | --- | --- | --- | --- | --- |
|  | Inlet | Outlet | Reduction % | Inlet | Outlet | Reduction % |
| CO (ppm) | 16.20 | 7.23 | 55.34 | 16.42 | 7.30 | 55.54 |
| SO$_2$ (ppb) | 107.65 | 14.55 | 84.02 | 184.72 | 23.55 | 87.25 |
| NO$_2$ (ppb) | 1422.73 | 9.85 | 99.22 | 1445.82 | 12.22 | 99.15 |
| O$_3$ (ppb) | 912.33 | 154.02 | 84.52 | 1092.25 | 163.32 | 85.05 |

In the conditions indicated above the following levels were measured:

CO: average level 14 ppm, reduction 28% (4 ppm)

NOx (NO+NO$_2$): average level 5 ppm, reduction 60% (3 ppm)

SO$_2$ : average level 0.5 ppm; reduction approximately 100%

CO$_2$ : average level 2800 ppm; reduction 10% (300 ppm)

Residual ozone at outlet: traces, <<0.1 mg/m$^3$

Flow rate of treated air: 1890 mm$^3$/hour

Energy consumption: <2.8 kWh

Water consumption: <7 liters/hour

Duration of bath : over 24 hours of continuous running.

EXAMPLE 3

A test on a prototype apparatus according to the invention as described in Example 1 was conducted by technical staff of ENEA (Italian Authority for New Technologies, Energy and Environment) with a pair of laboratory test apparatuses of their own and with data processed by a pair of Microwax computers. The test apparatuses were of the current mobile type used for tests on environmental pollution and the tests were carried out in a two-day scheduled program.

Upstream of the purification apparatus of the invention a metal chamber with a volume of 4 cubic meters was installed, in which polluted air was produced artificially by dilution into the environmental air of the exhaust from a diesel motor and an operation controlled motor.

The dilution was controlled in such a way as to obtain a concentration of pollutants comparable with the characteristics of urban smog.

A sensor mounted at the inlet of the purification apparatus took up polluted air continuously before treatment in the purification apparatus. This gas was directed to one test apparatus.

Another sensor identical to the first one mentioned above took up air at the outlet of the purification apparatus, and this was directed to the second test apparatus.

The two test apparatuses were identical and with exactly the same calibration.

For definite control during the first two hours of each day of test the same air was introduced into both the test apparatuses (first hour at air inlet, second hour at air outlet) and it was checked that the values measured in the different conditions were the same.

Two series of test were carried out for a six hour period each. After this time the measured values were automatically taken and processed by the two computers installed on board the test apparatuses.

EXAMPLE 4

Tests were carried out to assess the efficiency of mixed catalysts in abatement of pollutants from the exhaust fumes of an internal combustion engine. The catalysts were of Fe oxide/Pt group of catalysts comprising noble metals.

1. Apparatus

Exhaust fumes from a 1300 cm$^3$ motor vehicle diluted with environmental air were directed with a fan into the testing apparatus. Room temperature and flow rate were measured. CO concentration was measured at the inlet of a section in which 0.3 mg ozone per hour was produced. The flow was directed to a catalyst bed 100 mm thick and 100 mm diameter large. A heater was mounted before the catalyst bed. CO concentration was measured at the outlet with a similar instrument (Dragher Polytron, electrochemical cell 0 to 100 ppmCO, precision of 0,1 ppm).

The outlet temperature Tu of air was measured by a PT 100. The outlet flow rate was measured by an anemometer with sensibility 0.05 m/second.

2. Method a. Efficiency vs operation time test

This test was planned as follows.

The apparatus was started with no catalyst. After 15 minutes for warming the motor, the catalyst was installed and the outlet flow rate controlled. The inlet CO was controlled at 15–20 ppm.

Readings were made after 30 minutes and each subsequent 60 minutes by determining every 5 seconds the inlet and outlet CO concentration and the room temperature.

b. Efficiency vs outlet temperature test

This test was planned as follows.

The apparatus was started with no catalyst. The catalyst was installed after 15 minutes, the flow rate was measured and inlet CO was controlled to 15–20 ppm.

First reading was effected after 30 minutes operation and every 15 minutes the room temperature and the outlet temperature Tu were recorded until the CO abatement at room temperature was stabilized. A first heating step was carried out by heating the catalyst for 20 minutes.

Reading was effected by taking 120 successive measurements, one every 5 seconds, of outlet and inlet CO and recording the outlet temperature Tu.

c. The following catalysts were tested.

Catalyst 1: Fe oxide/Pt, alumina tablets 3 mm

Catalyst 2: Pt alumina tablets 3 mm

Catalyst 3: Fe oxide/Pt alumina spheres, d =3 mm

Catalyst 4: Fe oxide (triple concentration)/Pt alumina spheres, d =3 mm

Catalyst 5: Fe oxide/Pt granular coal

Catalyst 6: Pt/Pd honeycomb

The results of the tests for efficiency vs operation time are shown on Table 1.

TABLE 1

| Efficiency vs operation time | | | | | | |
|---|---|---|---|---|---|---|
| Catalyst | 1 | 2 | 3 | 4 | 5 | 6 |
| room temperature °C. | 30 to 40 | — | 26 to 35 | 25 to 30 | 33 to 40 | 18 to 22 |
| operations time, hours | 33 | — | 20 | 20 | 19 | 30 |
| bed thickness, mm | 100 | — | 100 | 100 | 100 | 75 |
| flow speed, m/s | 0.45 | — | 0.45 | 0.45 | 0.45 | 0.5 |
| space velocity, hour$^{-1}$ | 16200 | — | 16200 | 16200 | 16200 | 24.000 |
| inlet CO, ppm | 18 | — | 20 | 18 | 15 | 16 |
| average CO abatement, % | 33.5 | — | 26 | 24.7 | 36 | 21 |

TABLE 2

| Efficiency vs. temperature test | | | | | |
|---|---|---|---|---|---|
| Catalyst | 1 | 2 | 5 | 5 | 6 |
| Outlet temperature Tu, °C. | CO abatement, % | | | | |
| 15 | 17 | 15 | 15 | 15 | 15 |
| 20 | 17.5 | 16 | 15 | 17.5 | 21 |
| 25 | 17.5 | 18 | 17 | 21 | 29 |
| 30 | 18 | 21 | 18 | 25 | 34 |
| 35 | 22 | 25 | 18 | 27 | 40 |
| 40 | 25 | 27 | 19 | 30 | 48 |
| 45 | 37 | 33 | 21 | 34 | 51 |
| 50 | 45 | 45 | 30 | 43 | 55 |
| CO average inlet conc. (ppm) | 15 | 20 | — | — | 15 |
| bed thickness, mm | 100 | 100 | 100 | 130 | 75 |
| flow speed, m/s | 0.45 | 0.45 | 0.45 | 0.35 | 0.50 |
| space velocity, hour$^{-1}$ | 16200 | 16200 | 16200 | 9700 | 24000 |

The results of the tests are discussed hereinbelow.

The operational requirement of an apparatus according to the invention in environmental conditions is to abate about 8 over 16 ppm of inlet CO dispersed in the environment air, with an efficiency as more constant as possible over the time even at low environmental temperatures and with as low as possible heat supply.

Catalysts 1 and 3 show a good constancy over the time, how they require a not negligible heat supply and appear to be sensitive to humidity. They can be considered as equivalent, with some minor differences in pressure drop in the air flow.

Catalyst 4 also requires some heat supply. The efficiency vs temperature test on catalyst 2, compared to catalyst 1, shows an improved efficiency between 30 and 35° C. However a sufficient abatement is obtained only above a temperature of 45° C. of the outlet air.

Catalyst 5 shows a performance superior to the preceding catalysts. The durability test (efficiency vs time) carried out at a room temperature of 33°0 to 40° C. shows an average abatement of 36%, whereas catalyst 1 shows an abatement of 33.5% at room temperature of 30°=0 to 40° C.

Catalyst 5, however, is less dense than catalyst 1, so that it appears that a lighter mass thereof performs the same abatement of a heavier mass of catalyst 1.

The tests indicate that catalyst 6 show a superior performance as to the amount of abatement (21% average from 18° to 22° C), particularly in the temperature test. An acceptable amount of abatement is obtained already at a temperature of 35° C. of the outlet air.

Moreover, the honeycomb structure can make easier to solve some problems of construction and it enables the available heat to be used for directly heating the catalyst rather than using the air flow to the same purpose.

Although the invention has been described in considerable detail, it will be evident to experts in the field that modifications and variations thereto may be carried out without departing from the scope of the claims.

For example it is possible to provide an additional washing section placed upstream of the oxidation section to perform preliminary reduction of $SO_2$, dust and particulate, which would result in a better yield in the catalytic system in the oxidation section.

Conversely it is possible to eliminate one or more of the processing sections when the concentration of one or more of the pollutants in the air is so low as to make the presence of this section useless or when considerations of power consumption or general economy or encumbrance may make it advisable.

Furthermore, the apparatus illustrated in the examples has been designed as a free standing modular unit for application on a vehicle not specifically designed for the purpose, but it is understood that the apparatus may also be constructed during the manufacturing cycle of the vehicle itself as an integral part thereof.

We claim:

1. An apparatus for the purification of polluted air in an urban environment installed on a transport vehicle, comprising:

an inlet section for the air to be purified;

a means for introducing air from the environment into said inlet section;

an oxidation section following said inlet section, to treat the air by oxidizing CO into $CO_2$ and nitrogen oxides $NO_x$ into $NO_2$ by the action of nascent oxygen and a catalyst A, active at ambient temperature, said catalyst A being selected from the group consisting of an oxide of a metal from the first series of transition elements of the periodic table or an active salt thereof, a mixed catalyst based on said oxide or salt with a metal of Group VIII or Group IB of the second and third series of transition elements, Pt, and a mixed catalyst of Pd, Pt and Au where one metal is mixed with another, said nascent oxygen being generated by decomposition of ozone produced by an ozone producing means in said oxidation section, a washing section following said oxidation section wherein $SO_2$, said oxidized CO and said oxidized nitrogen oxides from said oxidation section are removed by reaction with hydroxyl ions, derived from lime or a mixture of lime and sodium bicarbonate, in an aqueous washing solution to form insoluble salts, and wherein said nascent oxygen, residual ozone, and particles, dust and unburned substances in the air to be purified, are abated by contact with a catalytic filter containing a catalyst A, said washing section comprising a series of partition walls which create a labyrinth route for passage of the treated air, and a series of nozzles directing said aqueous washing solution under pressure against the surface of said walls to create a barrier of atomized liquid through which the treated air to be purified would pass;

a means for separating said insoluble salts from said aqueous washing solution;

a means for renewing said aqueous washing solution which includes a means for supplying lime or a mixture of lime and sodium bicarbonate to renew said aqueous washing solution for return to said washing section; and a discharge section following said washing section for discharging the purified air into the external environment.

2. An apparatus according to claim 1, wherein said catalyst is based on a metal oxide selected from the group consisting of iron oxide, NiO, ZnO, $MnO_2$, CuO, and $CuCr_2O_4$.

3. An apparatus according to claim 1, wherein said catalyst in said oxidation section is a mixed catalyst based on said oxide or salt and Pt.

4. An apparatus according to claim 3, wherein, in said mixed catalyst, said oxide or salt is iron oxide.

5. An apparatus according to claim 1, wherein a the apparatus is mounted on a transport vehicle as a modular unit within a casing.

6. An apparatus according to claim 1, wherein said discharge section comprises an accumulation chamber (7) with a collection bath having an increased cross section of flow in order to slow down the mass flow rate of air and separate the drops of washing liquid from the air transporting said drops, and a catalytic filter for final reduction of residual ozone.

7. An apparatus according to claim 1, wherein said catalyst in said oxidation section is heated by heat exchange with the heat dissipated from the motor of said transport vehicle.

8. An apparatus according to claim 7, wherein exhaust fumes from the motor of said transport vehicle are passed in heat exchange relationship with said catalyst in said oxidation section.

9. An apparatus according to claim 7, wherein cooling fluids of the motor of said transport vehicle are passed in heat exchange relationship with said catalyst in said oxidation section.

10. An apparatus according to claim 1, wherein said oxidation section comprises a group of ultraviolet lamps having a wavelength lower than 250 millimicron for the production of ozone and the formation of nascent oxygen in the air to be purified.

11. An apparatus according to claim 10, wherein said washing section further comprises a flow meter for switching on said ultraviolet lamps in said oxidation section only when the mass flow rate of air exceeds a minimum threshold level.

12. An apparatus according to claim 1, wherein said oxidation section comprises a high voltage electric discharge means for the production of ozone and the formation of nascent oxygen in the air to be purified.

13. An apparatus according to claim 1, wherein said series of partition walls comprises between 4 and 8 partition walls.

14. An apparatus according to claim 1, further comprising a washing, section disposed on the inlet side of said oxidation section.

15. An apparatus according to claim 1, wherein, in said washing section, in said discharge section, or in both, the walls of said section or sections are coated with at least one of said catalyst A for the elimination of residual ozone and pollutants.

16. Process for the purification of polluted air in an urban environment by means of an apparatus transported by a vehicle, comprising the steps of:

supplying ambient polluted air to a reaction system;

producing ozone and decomposing it to form nascent oxygen within the polluted air to be purified;

oxidising the pollutants CO and $NO_x$ into $CO_2$ and $NO_2$ by reaction with said nascent oxygen and then passing the resultant air through a bed of a catalyst A active at ambient temperature, said catalyst A being selected from the group consisting of an oxide of a metal from the first series of transition elements of the periodic table or an active salt thereof, a mixed catalyst based on said oxide or salt with a metal of Group VIII or Group IB of the second and third series of transition elements, Pt, and a mixed catalyst of Pt, Pd and Au where one metal is mixed with another;

washing the treated air by passing the air through sprays of a washing liquid formed of an aqueous solution containing lime, or a mixture of lime and $NaHCO_3$, and hydroxyl ions derived therefrom, along a serpentine-like route to form insoluble salts, and to reduce particulates and unburned materials to purify the air;

recycling the liquid by:

(A) filtering the washing liquid used in said washing step, and settling and collecting the insoluble matter and impurities;

(B) adding makeup lime or a mixture of lime and sodium bicarbonate to recondition the filtered washing liquid;

(C) supplying said reconditioned washing liquid to said washing step; and discharging the purified air into the outside environment.

17. Process according to claim 16, further comprising a separating step before said discharging step, wherein the flow velocity of the treated air is slowed down in an accumulation chamber to separate the gaseous phase from the atomised liquid phase.

18. Process according to claim 16, wherein said catalyst bed of said oxidizing step is heated by heat exchange from the exhaust fumes of the motor of said vehicle.

19. Process according to claim 16, wherein said catalyst bed of said oxidizing step is heated by heat exchange with the cooling fluids of the motor of said transport vehicle.

* * * * *